W. N. FLORENCE.
TRACTION WHEEL.
APPLICATION FILED MAR. 4, 1920.
1,393,210.
Patented Oct. 11, 1921.
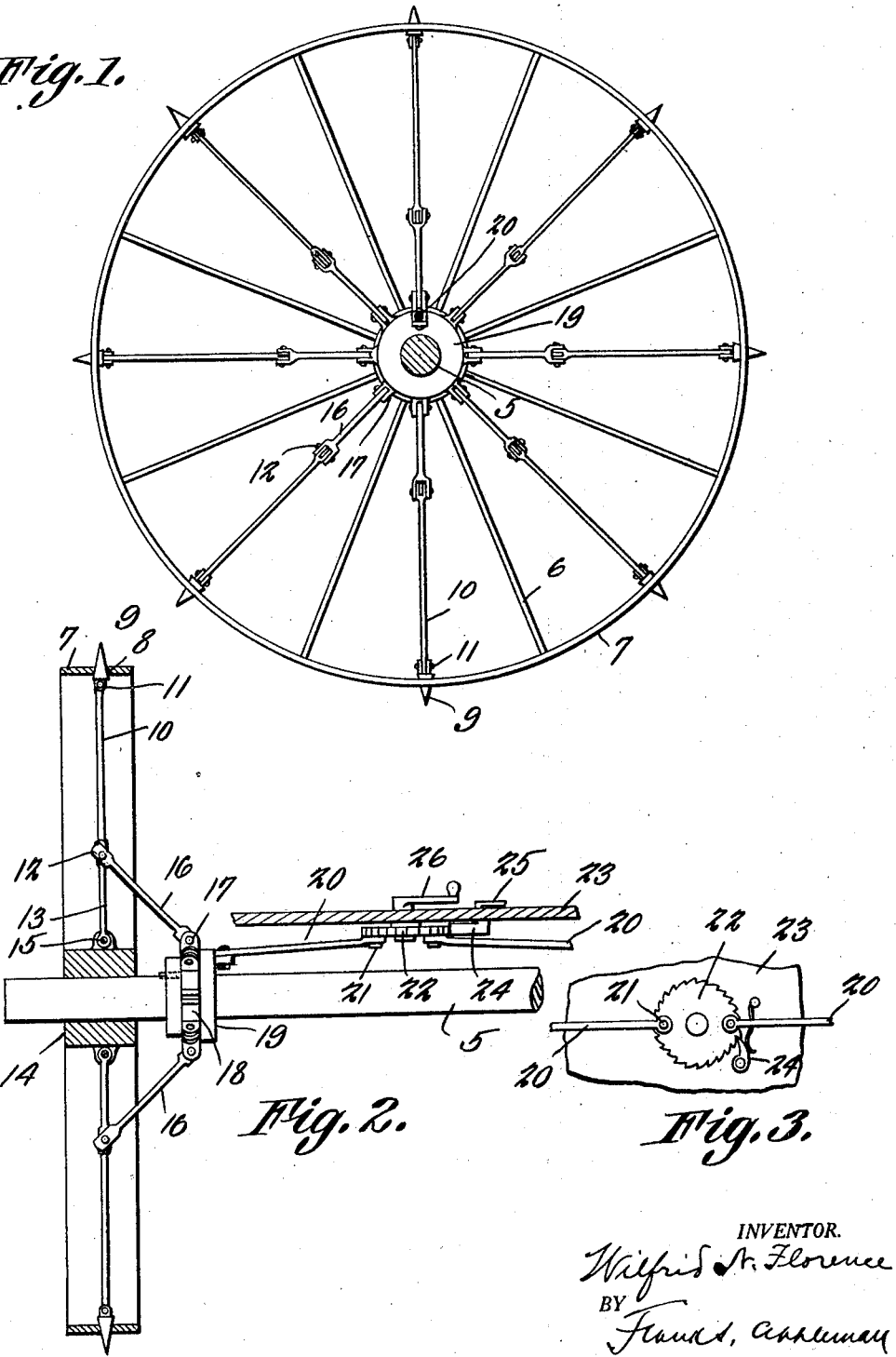
INVENTOR.
Wilfrid N. Florence
BY
Frank I. Cushman
ATTORNEY.

UNITED STATES PATENT OFFICE.

WILFRID N. FLORENCE, OF MIDDLEBURY, VERMONT.

TRACTION-WHEEL.

1,393,210.  Specification of Letters Patent.  Patented Oct. 11, 1921.

Application filed March 4, 1920. Serial No. 363,143.

*To all whom it may concern:*

Be it known that I, WILFRID N. FLORENCE, a citizen of the United States of America, and resident of Middlebury, in the county of Addison and State of Vermont, have invented certain new and useful Improvements in Traction-Wheels, of which the following is a specification.

This invention relates to traction wheels and particularly to projections on traction wheels adapted to prevent slipping of the same.

An object of this invention is to provide novel means whereby spurs or spikes of traction wheels may be adjusted with relation to a rim of the wheel so that they may be made to project a greater or less extent therethrough to increase or diminish the effect or action of the spikes or spurs according to the condition of the roadbed.

When the wheels are traveling over muddy or soft roads or on roadbeds having coatings of ice or snow, the condition of the road will have marked effect on the action of the spikes and that if the roadbed is relatively hard, the spikes if projecting to too great an extent will cause undue vibration and jar of the vehicle or machine, whereas if the spikes project to a slight extent where the roads are soft or muddy, desirable results will be attained and it is the purpose, therefore, to provide novel means whereby the spikes may be adjusted or set to suit these particular or different conditions of use and requirements and to that end, novel means are provided whereby the spikes or spurs may be held in projected or retracted positions according to the wishes of the user, novel means being provided to effect the adjustment and to hold the parts in different positions of adjustment.

With the foregoing and other objects in view, the invention consists in the details of construction and in the arrangement and combination of parts to be hereinafter more fully set forth and claimed.

In describing the invention in detail, reference will be had to the accompanying drawings forming part of this specification wherein like characters denote corresponding parts in the several views, and in which—

Figure 1 illustrates a view in elevation of a traction wheel, the shaft of which is in section;

Fig. 2 illustrates a transverse sectional view of a wheel, the same being mounted on an axle; and Fig. 3 illustrates an underneath plan view of the means for affording an adjustment of the spikes.

I have heretofore used the term "spikes" and "spurs" in the alternative and I wish to be understood as meaning that the element or elements to be employed for preventing skidding of the wheels may be a spike or like device which may be projected or retracted and I do not wish to be limited with respect to the device used, but in the further description of the invention, I will employ the term "spike" in its comprehensive definition.

As shown in the drawing, the axle 5 is provided with a traction wheel 6, the rim 7 of which has apertures 8 through which the spikes 9 project. The inner end of the head of each spike has a link 10 connected to it by the pivot 11 and the said link has a pivoted joint 12 by which it is connected to a link 13, the inner end of which link 13 is connected to the hub 14 by a pivot 15 so that the links may be swung or oscillated to project or retract the spikes according to whether the joint 12 is broken or not.

A link 16 is pivotally connected to the links 10 and 13 at the joint 12 and the inner ends of the links 16 are pivotally connected to ears 17 of a sleeve 18 which sleeve is splined on the axle 5 so that the sleeve and traction wheel may rotate with the axle.

The axle 5 has a collar 19 slidable on it and the said collar is pivotally connected to an operating rod 20 by which the collar is moved longitudinally of the shaft and forced against the sleeve to prevent its moving toward the center of the shaft.

By moving the collar on the shaft, the sleeve may be allowed to move toward the center of the shaft, thus permitting the spikes to move inwardly so that they will not project to a great extent beyond the tire or rim of the wheel. By moving the collar outwardly and holding it in the position shown in Fig. 2, the spikes will be projected to their maximum degree as will be apparent.

As a means for operating the sleeve, the rod 20 has its inner end connected to a pin 21 on the ratchet wheel 22 and the said ratchet wheel is rotatably mounted with respect to a platform or vehicle body, a fragment 23 of which is shown. A spring pressed dog 24 engages the teeth of the ratchet wheel and holds the parts in different positions of adjustment, it being shown that the dog has an extension 25 which may be manipulated to disengage the dog from the ratchet wheel. The ratchet wheel is turned by a crank 26 so that the collar may be drawn inwardly or forced outwardly according to the desires of the operator and hence the action of the spikes may be regulated according to the condition of the roadbed and the adjustment can be expeditiously made so that even though the condition of the roadbed changes from time to time, the devices can be set to give the best results under such conditions.

I claim

1. In a traction wheel, a hub having a rim, said rim having apertures therein, traction elements operating in the said apertures, links pivotally connected to the said spikes, links pivotally connected to the hub and to the first mentioned links, links pivotally connected to the inner and outer links at their junctions, a sleeve, a shaft on which the sleeve is splined, means for pivotally connecting the last mentioned links to the sleeve, a collar slidable on the shaft for holding the sleeve in different positions of adjustment, and means for holding the collar at different positions of adjustment on the shaft.

2. In a traction wheel, a hub, a rim, said rim having apertures therein, traction elements projecting through the said apertures, a link pivotally connected to each traction element, a link pivotally connected to each of the aforesaid links and to the hub of the wheel, a shaft on which the wheel is mounted, a sleeve splined on the shaft, links pivotally connected to the said sleeve and to the links at their joints of connection, a collar slidable on the shaft and adapted to engage the sleeve, and means for holding the collar at different positions of adjustment.

WILFRID N. FLORENCE.